3,087,968
**PROCESS FOR OXIDIZING OLEFINS TO ALDE-
HYDES, KETONES, AND ACIDS**
Lothar Hörnig, Emmerich Paszthory, Otto Probst, and
Wilhelm Riemenschneider, Frankfurt am Main, and
Alfons Steinmetz, Kelkheim, Taunus, Germany, assignors to Farbwerke Hoechst Aktiengesellschaft vormals
Meister Lucius & Brüning, Frankfurt am Main Hochst,
Germany, a company of Germany
No Drawing. Filed Nov. 17, 1959, Ser. No. 853,454
Claims priority, application Germany Nov. 19, 1958
3 Claims. (Cl. 260—604)

The present invention relates to a process for oxidizing olefins to aldehydes, ketones and acids.

In U.S. patent applications No. 747,115, filed July 8, 1958; No. 747,116, filed July 8, 1958; No. 750,150, filed July 22, 1958; No. 760,539, filed September 12, 1958; No. 763,691, filed September 26, 1958, and now abandoned; No. 768,624, filed October 21, 1958; No. 770,007, filed October 28, 1958; No. 770,019, filed October 28, 1958; No. 770,020, filed October 28, 1958; No. 769,912, filed October 27, 1958; No. 769,554, filed October 27, 1958; No. 788,488, filed January 23, 1959; No. 803,096, filed March 31, 1959; No. 806,205, filed April 14, 1959; No. 843,783, filed October 1, 1959; and No. 848,531, filed October 26, 1959, there are described processes for oxidizing ethylene or other olefins, such as propylene, butylene, isobutylene, pentene and butadiene to the corresponding aldehydes, ketones and acids having the same number of carbon atoms as the olefin, by means of oxygen or gases containing oxygen in the presence of water or water vapor as liquid or solid catalysts containing redox systems and compounds of noble metals of group VIII of the periodic table. As noble metal salts there are generally used salts of those noble metals of group VIII of the periodic table which have a maximum stable valency of 4, for example ruthenium, rhodium, iridium, platinum and advantageously palladium. As compounds capable of forming redox systems and present in the catalyst there may be used, for example, those of copper, mercury, cerium, thallium, tin, lead, titanium, vanadium, antimony, chromium, molybdenum, uranium, manganese, iron, cobalt or nickel. There are advantageously used redox systems containing at least one salt of at least one metal, which metal can exhibit different valencies under the reaction conditions applied and is at least monovalent in the reduced stage.

It has been found that, when the aforesaid processes are carried out with the use of a liquid catalyst in one or two stages or when the reaction is partially combined with the regeneration, traces of the inorganic compounds or metals contained in the catalyst still remain at the position where the reaction mixture is separated into liquid and gaseous or vaporous components, for example water vapor, vaporous reaction products, olefins or oxygen which have not been reacted or inert gases, and are entrained by the gaseous or vaporous catalyst components. With solid catalysts, this phenomenon appears after the gases or vapors have come into contact with the catalyst.

In the aforesaid processes, compounds capable of forming redox systems and/or the aforesaid noble metals in the form of compounds and/or metals may be entrained by the gases or vapors. This phenomenon is due, for example, to a fine atomization produced by expansion of the reaction mixture or is caused by small catalyst droplets mechanically entrained by the gas or vapor or by abrasion of solid catalyst particles or even by the partial pressure of the aforesaid catalyst components under the pressure and temperature conditions of the process, although this partial pressure is only small. Furthermore, the catalyst liquid or liquids containing components of catalyst may wet the gas spaces or quiescent zones following the aforesaid separation of catalyst liquid or solid catalysts from gas or vapor, and the resulting film, which may be only fine, may migrate together with the current of gas or vapor in the direction of flow of the gas or vapor. Besides losses of catalytically active components, for example high-grade metals, corrosion occurs in the units for working up the gas and/or vapor which follow the aforesaid spaces and quiescent zones. It has therefore been hitherto necessary to make these units from a material which is resistant to corrosion produced by catalyst components and consists of expensive metals, for example titanium or tantalum, or is not well suitable for the aforesaid measures for working up the gases and/or vapors since it has, for example, a poor thermal conductivity, e.g. enamel, brick linings or coatings of rubber or plastics. On the other hand, the above mentioned phenomena may be avoided by providing large additional quiescent spaces which permit the application of a gas or vapor velocity smaller than the sedimentation velocities of the components leaving the catalyst. Such spaces are, however, expensive and diminish the safety against explosion of the whole unit.

Now we have found that in the aforesaid processes corrosion produced by catalyst components in units for working up gaseous and/or vaporous components, for example coolers or washing columns, and losses of high-grade catalyst components can be avoided by bringing the gaseous or vaporous components leaving the catalyst into contact with metals or metal alloys of a fairly large surface area which possess a smaller electrochemical potential than the noblest components contained in the catalyst and are at least as noble as aluminum and therefore have an electrochemical potential below +1.7. It is of advantage to provide for a large exchange surface, i.e. a large metal surface.

According to the invention, a corresponding device consisting of not noble metals is disposed in the passage for the gaseous or vaporous components, for example immediately after the said components have been separated from the liquid components or have passed the solid catalyst. If the device consists of metals or metal alloys of a nature different from that of the catalyst or when it is desired to prevent any minor quantities of the metals constituting the device from accumulating in the form of their compounds in the catalyst medium, it is of advantage to insert the device in the passage for the gas and/or vapor in a manner such that any metal compounds which may possibly form cannot penetrate into the catalyst; the device may be disposed, for example, in a descending passage for gas and/or vapor.

The metals or metal alloys of a standard electrode potential at 25° C. below +1.7 in the "Electromotive Force Series of Elements" as compiled by Giles B. Cooke and published in the Handbook of Chemistry and Physics, 23rd edition (1939), should have large surface areas. They are used, for example, in the form of chips, sieves, various kinds of small fillers of regular or irregular shape or in the form of other bodies having a large surface area per unit of volume. The metal or metal alloy may consist of cheap waste material, for example scraps or turnings, which is important from an economical point of view.

The metals having large surface areas are advantageously placed in a container made of the same metal or metal alloy, and advantageously consisting of a material which is not attacked by the metals used or their compounds and the catalyst components. In the latter case, the used up metal filling can be replaced from time to time. From the used up metal filling, the precipitated metal may be recovered, if desired, and returned, for example, to the catalyst. To prevent corrosion of the container for the metal filling, the container is advantageously made of titanium or titanium alloys containing, for example, at least 30% titanium, or of tantalum. Glass vessels or enamelled or rubber coated vessels may also be used, if desired. Alternatively, the container may be protected against corrosion, under appropriate conditions of temperature and pressure, by lining it with plastics such as polyolefins, polytetrafluorethylene or hardenable unsaturated polyesters or phenol, cresol or xylenol formaldehyde resins. Those metals or metal alloys are advantageously used which are also exposed to a corrosion due to catalyst components in the above mentioned units disposed in the passage for the gas and/or vapor, or are present as such or in the form of their compounds in the catalyst. Furthermore, metals or metal alloys are advantageously used which as such or in the form of their compounds neither attack the reaction products nor produce a conversion, for example, of catalytic nature, in the presence of other gases or vapors such as olefins, oxygen or water vapor, under the conditions of pressure and temperature prevailing in the apparatus. With some metals, it may be advantageous to provide for the exclusion of one or the other reaction component as is the case, for example, when the process is carried out in two separate stages (see the aforesaid patent applications Nos. 750,150; 769,554; 843,783 and 848,531).

The process of the present invention has the advantage that, with an appropriate metal or metal alloy, by-products, such as organic acids or chlorinated compounds can be neutralized by the metal or metal alloy itself and/or by metal compounds formed by a secondary reaction, provided that the secondary products which may be formed thereby have no detrimental or unfavorable influence on the desired reaction products such as aldehydes and ketones. The process of the present invention is therefore of particular advantage when any carboxylic acid which may form is present in the reaction product in a small quantity only.

As metals or metal alloys having a more negative electrochemical potential than $+1.7$ there may particularly be used those of which the potential is within the aforesaid range even after a superficial passivation, for example, with oxygen. There may be used, for example, iron, iron alloys with carbon, silicon or chromium or chromium alloys, cadmium or cadmium alloys, zinc or zinc alloys with copper, aluminum, chromium or iron, or various magnesium alloys as far as the potential in the electromotive series exceeds the above mentioned value or aluminum alloys. Metals or metal alloys of a standard electrode potential within the range of $+1.7$ to $0$ in the "Electromotive Force Series of Elements" as compiled by Giles B. Cooke and published in the Handbook of Chemistry and Physics, 23rd edition (1939), are particularly advantageous.

The process of the present invention is carried out in an acid to neutral medium. The preferred pH-values are within the range from 0.8 to 5. Lower pH-values, e.g. down to 0.5, may, however, also be used. If some oxygen is already applied in the first step the content thereof should not be higher than 14% by volume. The reaction products formed in the reaction stage may be removed from liquid catalysts by stripping with steam or an inert gas. In two-stage operations in which the catalyst is reacted in the first stage with the olefin—and, if desired, with some oxygen—and regenerated in a second stage by the action of oxygen, such stripping is advantageously performed prior to the regeneration. The regeneration may be brought about under known conditions, e.g. at 50 to 150° C., and may be carried out under pressures and temperatures different from those of the first stage in which the catalyst is contacted with the olefin.

In the oxidation of olefins to aldehydes, ketones and carboxylic acids the above-mentioned catalysts, preferably the chlorides of palladium and copper may contain very small amounts of noble metal salts, e.g. it is often sufficient to apply copper and palladium in a ratio above 15:1, preferably up to 100:1, or even in a still higher ratio, e.g. 500:1, or to apply copper and iron salts in such an amount that the ratio of the sum of copper and iron to the noble metal is also above 15:1, and amounts for example up to 100:1 or 500:1.

As oxidizing agents oxygen or gases containing oxygen may be used. When the process is carried out in two stages in a manner such that a small amount of oxygen is concomitantly used already in the first stage, as described below, air, being the cheapest oxidizing agent, is advantageously used in the second stage. The reaction may also be promoted by the addition of active oxidizing agents, for example peroxidic compounds such as hydrogen peroxide, sodium peroxide, potassium persulfate, peracetic acid, potassium permanganate, sodium bichromate, ceric sulfate, potassium chlorate, bromotrichloride or hypochlorous acid. In special cases, especially when the reaction is carried out for a prolonged time, it is of advantage to add anions or compounds yielding anions. It is particularly advantageous to subsequently introduce chlorine ions into the process. The anions may, e.g., be supplied per se, for example in the form of hydrochloric acid, hydrobromic acid or chloric acid, or in the form of compounds from which anions are liberated under the reaction conditions. Such compounds are, e.g., ammonium chloride, zinch chloride, sulfuryl chloride, sodium hydrosulfate, hypochlorous acid, bromotrichloride, or saturated aliphatic halogen compounds of low molecular weight, such as ethyl chloride, propyl chloride, butyl chloride, acetyl chloride, mono-, di- or trichloro-acetic acid, dibromoacetic acid etc. It may also be of advantage to proceed in the presence of a neutral salt, such as sodium chloride, potassium chloride, lithium chloride, calcium chloride, magnesium chloride, or another salt, such as $FeCl_3$, $FeCl_2$, $ZnCl_2$ or $CuCl_2$, whereby the solubility of the cuprous chloride in the liquid catalyst is, for example, increased. The process may also be carried out with the concomitant use of a solvent. For example, aqueous catalyst systems may be applied which contain hydrophilic solvents that are stable under the reaction conditions, for example acetic acid, ethylene glycol, propylene glycol, glycerol, dioxan or mixtures thereof.

Under the above described conditions olefins can be reacted to aldehydes and ketones. For example, ethylene yields acetaldehyde, propylene yields preponderantly acetone and propionaldehyde, the various butylenes yield methyl-ethyl-ketone, butyraldehyde or isobutyraldehyde, while diacetyl and crotonaldehyde may be obtained from butadiene. The reactants may also be diluted, if desired, with an inert gas, such as nitrogen, carbon dioxide, methane, ethane, propane or butane and other saturated aliphatic compounds or with other compounds, such as cyclohexane, benzene or toluene. Furthermore, the olefins may be diluted with carbon monoxide and/or hydrogen, if desired in admixture with one or several of the aforesaid substances.

The catalyst may contain as anions chlorine ions or halogen ions other than chlorine ions, such as bromine ions, nitrate or chlorate or perchlorate radicals or mixtures of these anions, e.g. with sulfate or acetate radicals.

When copper containing catalysts are used, it is in some cases advisable to keep the molar ratio of copper to halogen and more especially that of copper to chlorine within the limits of 1:1 to 1:2 and preferably within the limits of 1:1.5 to 1:2. Furthermore it is sometimes advisable to provide the flow tubes with quiescent zones as is described in the above application Ser. No. 769,912.

Finally the reaction may be carried out under the influence of active radiation, such as ultraviolet light.

The process of the present invention may also be carried out in a manner such that a small amount of oxygen or gas containing oxygen is added to the olefin or gas containing olefin in the first stage. The amount of oxygen should, however, be smaller than the stoichiometrical amount so that the catalyst solution need be regenerated in the second stage only with a correspondingly smaller amount of oxygen. In the first stage, the ratio of olefin to oxygen may be, for example, at least 2.5:1, advantageously at least 6:1, whereby the olefin and oxygen may be added separately or in the premixed state to the catalyst solution and the oxygen and/or the olefin may also be introduced in portions through several inlets following one another in the direction of flow. By an appropriate combination of such measures an almost 100% conversion may be obtained as is described, for example, in the above application S.N. 843,783.

The following example serves to illustrate the invention, but it is not intended to limit it thereto.

*Example*

A two-stage unit for the oxidation of ethylene to acetaldehyde comprising separate parts for the reaction and the regeneration was charged with a liquid catalyst containing, per liter, 0.04 mol palladium, 2.06 mol copper, 4.4 mols chlorine and 5% acetic acid. After regeneration, 1.5 m.$^3$ per hour (measured at N.T.P.) of oxygen were obtained, while the reaction yielded 2 m.$^3$ per hour (measured at N.T.P.) of a gas containing 20% by volume acetaldehyde, 79.6% by volume ethylene, 0.3% by volume ethane and 0.1% by volume carbon dioxide. These gases had a temperature of 75° and 80° C., respectively, and were saturated with water vapor. Both passages for the gas were provided with a cylindrical device of titanium (inside diameter, 200 millimeters; length, 300 millimeters) in a manner such that any condensate forming could not flow back into the catalyst. Both containers were filled with iron turnings of a width of about 3 millimeters. To examine the effect obtained, the oxygen was cooled to 20° C. after its passage through the container. Iron chloride and a small portion of iron acetate were detected in the condensate, but no palladium or copper. After 20 hours of operation, the iron turnings contained about 4 grams palladium and about 11 grams copper. When operating on a large scale, the oxygen may, of course, be conducted in a cycle without cooling. After the gas containing ethylene and acetaldehyde had been passed through the second container filled with iron turnings, the acetaldehyde was removed from the gas by washing with water. Only iron but no palladium or copper could be traced in the wash water. After 60 hours of operation, the charge in the container contained about 9 grams palladium and 26 grams copper.

We claim:

1. A process for the conversion of an olefinic hydrocarbon to a carbonyl compound selected from the group consisting of aldehydes and ketones by oxidation of an olefinic carbon atom of said olefinic hydrocarbon to a carbonyl group, which process consists essentially of contacting said olefinic hydrocarbon and oxygen, in a neutral to acid medium, with water and a catalyst of (a) a salt of a noble metal selected from the group consisting of palladium, iridium, ruthenium, rhodium, and platinum, and (b) as a redox system, an inorganic salt of a metal showing several valence states under the reaction conditions applied, separating gaseous and vaporous reaction products from said catalyst, and, before further processing of these products, contacting said gaseous and vaporous reaction products, which products contain trace amounts of entrained noble metal salts from said catalyst, with a large surface of at least one metal having an electrochemical potential between +1.7 and 0, whereby said reaction products are rendered less corrosive by conversion of the electrochemically active noble metal salts therein to free metal.

2. A process as in claim 1 wherein the gaseous and vaporous reaction products are contacted with an alloy of metals having an electrochemical potential between +1.7 and 0.

3. A process as in claim 1 wherein said gaseous and varorous reaction products are contacted with iron.

References Cited in the file of this patent

FOREIGN PATENTS

| | | |
|---|---|---|
| 713,791 | Germany | Nov. 14, 1941 |
| 891,209 | France | Mar. 1, 1944 |

OTHER REFERENCES

Phillips: American Chemical Journal, vol. 16 (1894), page 267.

Chatt: Chemical Abstracts, vol. 48 (1954), pages 5067–5068.